S. B. GRIFFEN.
WHEEL FOR VEHICLES.
APPLICATION FILED MAY 7, 1908.
998,893.
Patented July 25, 1911.
2 SHEETS—SHEET 1.
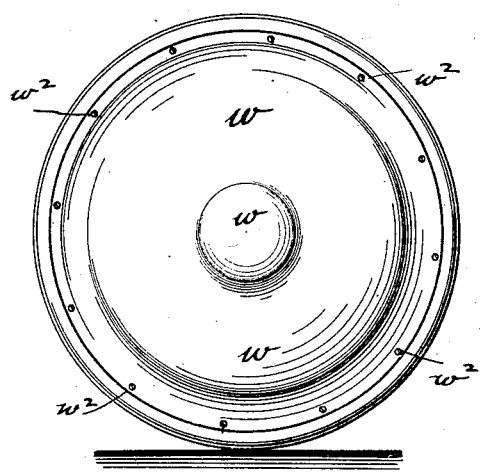
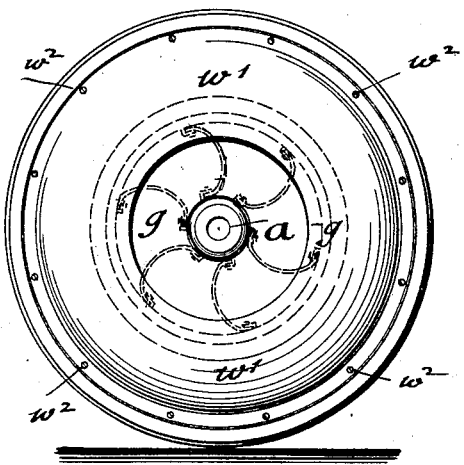
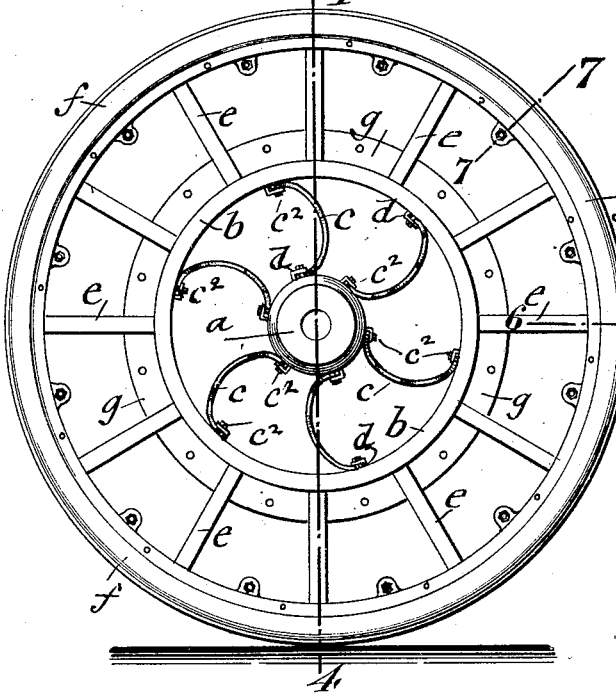
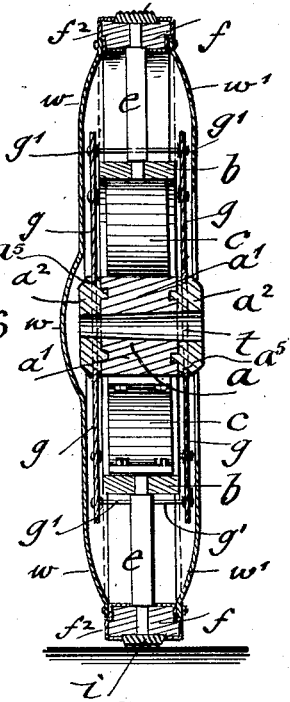
Witnesses:
Fannie Fisk
Henry J. Bulrbier
Inventor
Spencer B. Griffen
By his Attorneys
Goepel & Goepel S. B. GRIFFEN.
WHEEL FOR VEHICLES.
APPLICATION FILED MAY 7, 1908.
998,893.
Patented July 25, 1911.
2 SHEETS—SHEET 2.
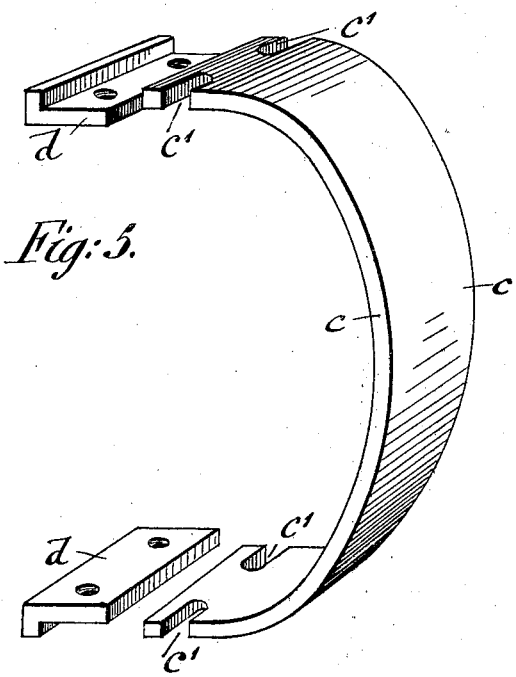
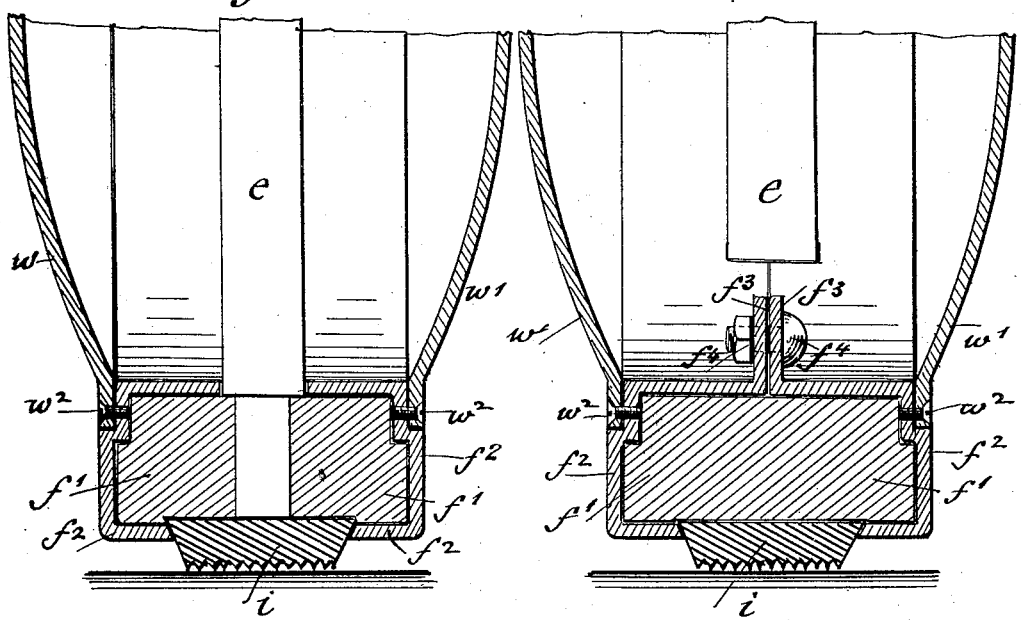

UNITED STATES PATENT OFFICE.

SPENCER B. GRIFFEN, OF AMITYVILLE, NEW YORK.

WHEEL FOR VEHICLES.

998,893.           Specification of Letters Patent.      Patented July 25, 1911.

Application filed May 7, 1908. Serial No. 431,439.

*To all whom it may concern:*

Be it known that I, SPENCER B. GRIFFEN, a citizen of the United States, residing at Amityville, in the county of Suffolk and State of New York, have invented certain new and useful Improvements in Wheels for Vehicles, of which the following is a specification.

This invention relates to an improved wheel for vehicles which is mainly intended for automobiles, motor cycles and the like, but which can also be used for road-vehicles in general, the wheel belonging to that type in which flat cushioning springs are interposed between the spokes and the hub so as to take up the pressure of the load on the tire, and substitute a more permanent construction for the expensive pneumatic tires in general use; and for this purpose the invention consists of a wheel for vehicles which comprises a hub, a circular frame concentric with the hub, flat cushioning springs interposed between the hub and the circular frame, a solid tire, and radial spokes interposed between the tire and the circular frame.

The invention consists further of a vehicle-wheel the hub of which is made in tightly-fitting sections, a spoke-supporting frame concentric with the hub, flat cushioning springs interposed between said hub and the concentric frame, sheet-metal webs that inclose the cushioning springs and are connected at their circumference, radial spokes resting on the concentric frame, and a solid tire surrounding the spokes.

The invention consists further of certain details of construction of the tire which will be fully described hereinafter and finally pointed out in the claim.

In the accompanying drawings, Figure 1 represents an elevation of my improved wheel for vehicles taken from the outside, Fig. 2 is an elevation of the wheel taken from the inside, Fig. 3 is an elevation of the wheel with the outer covering web and inner disk removed for showing the construction of the same, Fig. 4 is a vertical transverse section on line 4, 4, Fig. 3 with the outer covering-web in place, Fig. 5 is a detail perspective view of one of the cushioning springs and the clips connecting the same with the hub and concentric frame respectively, and Figs. 6 and 7 are detail vertical transverse sections on lines 6, 6 and 7, 7, Fig. 3 with the outer covering-web in place.

Similar letters of reference indicate corresponding parts throughout the several figures.

Referring to the drawings, $a$ represents the hub, $b$ a circular frame which is located concentrically with the hub, and $c$ are flat cushioning springs which are interposed between the hub $a$ and circular frame $b$, said springs being made approximately C-shaped and provided with recesses $c^1$ extending inwardly at both sides of the ends, and attached at the ends by means of clips $d$ of L-shaped cross-section and bolts $c^2$ respectively, to the middle portion of the hub and the ring-shaped frame $b$.

$f$ represents a solid tire section supported on the ring-shaped frame $b$ by radial spokes $e$, the inner tenoned ends of the spokes being set into mortises in the circular frame $b$, and the outer tenoned ends into mortises of the tire $f$, as shown in Fig. 4. The hub $a$ is made of three sections, a middle wider section $a^1$ and two narrower end-sections $a^2$, which are connected by annular tenons and grooves or mortises, as shown in Fig. 4. A tapering thimble $t$ is inserted into the hub, the hub-sections being driven home on said thimble and held in position thereon. To the end-sections of the hub are attached disks $g$ which are provided with central openings for the hub and which are shrunk into shallow grooves $a^5$ at the ends of the hub. These disks are preferably made of sheet-steel or other suitable metal and connected at their outer ends by transverse bolts $g^1$ that are located in the spaces between the spokes. The disks $g$ render the wheel strong and rigid against side-pressure and serve to transmit the power from the hub to the spokes in turning on the axle. The disks $g$ inclose the cushioning springs and ring-shaped frame $b$ and form a tight casing for the same that permits, however, the free play of the cushioning springs under the pressure of the load.

The tire section $f$ is composed of fellies $f^1$ of wood, and two inclosing sections $f^2$ made of wrought iron or other suitable metal, said sections being provided at their inner ends with radial flanges $f^3$ which are connected by screw-bolts $f^4$ so as to inclose the wooden pieces or fellies while leaving an opening in the outer circumference of the sections $f^2$ which are provided with beveled edges in which is placed a filling-piece or band $i$ of hard leather, rubber or other material, preferably ribbed at the outer surface and provided with beveled edges so as to be firmly held in position by the sections $f^2$ on the wooden fellies. The filling piece or tire $i$ forms with its ribbed or corrugated face intimate contact with the surface of the road for preventing skidding. It can be readily replaced from time to time when worn out, by detaching the inclosing sections $f^2$ of the fellies and inserting a new filling piece in place of the old one. The inner corners of the sectional covering $f^2$ for the fellies are recessed for seating the circumference of an exterior disk-shaped web $w$, of sheet-steel, which extends over the hub and ring-shaped webs $g$ and hub and incloses thereby entirely the wheel from the outside. A second ring-shaped web $w^1$ is attached to the inner edge of the sectional covering $f^2$ and leaves the inner edge of the hub free for connection with the axle. The outer and inner webs $w$, $w^1$ are attached by means of screw-bolts $w^2$ to the recessed corners of the sectional covering for the fellies and serve to protect the interior of the wheel and increase the stiffness of the same, the webs yielding at the same time sufficiently for imparting the proper resiliency to the wheel and its cushioned interior portion. The outer portion of my improved wheel, including the circular part between the inner ring-shaped frame and the spokes, is cushioned by the C-shaped springs so as to yield sufficiently to the pressure of the load exerted thereon. The solid tire is not liable to punctures as the pneumatic tires and has sufficient strength to form an effective and durable wheel for automobiles and other vehicles of all kinds.

Having thus described my invention, I claim as new and desire to secure by Letters Patent:

In a wheel for vehicles, the combination of a hub, a ring-shaped frame concentric therewith, curved cushioning springs having each at each end a pair of oppositely extending outwardly-opening recesses, cross-sectionally L-shaped clips having perforations registering with the inner end of said recesses, and bolts passing through said perforations and said recesses and securing said ends to and between said clips and said hub and frame respectively.

In testimony, that I claim the foregoing as my invention, I have signed my name in presence of two subscribing witnesses.

SPENCER B. GRIFFEN.

Witnesses:
PAUL GOEPEL,
HENRY J. SUHRBIER.

---

Copies of this patent may be obtained for five cents each, by addressing the "Commissioner of Patents. Washington, D. C."